(12) United States Patent
Dalton (10) Patent No.: US 7,289,041 B2
(45) Date of Patent: Oct. 30, 2007

(54) ABSOLUTE POSITION CHAIN ENCODER

(75) Inventor: Bruce Dalton, Cornish, ME (US)

(73) Assignee: Control Devices, Inc., Standish, ME (US)

( * ) Notice: Subject to any disclaimer, the term of this patent is extended or adjusted under 35 U.S.C. 154(b) by 0 days.

(21) Appl. No.: 11/375,708

(22) Filed: Mar. 14, 2006

(65) Prior Publication Data

US 2007/0216544 A1   Sep. 20, 2007

(51) Int. Cl.
    *H03M 1/22* (2006.01)
(52) U.S. Cl. ............................................. 341/9; 341/10
(58) Field of Classification Search ............... 341/1–50
    See application file for complete search history.

(56) References Cited

U.S. PATENT DOCUMENTS 4,628,298 A    12/1986  Hafle et al.
4,736,187 A *  4/1988   Kibrick et al. ............. 341/3
4,914,437 A *  4/1990   Kibrick et al. ............. 341/3
4,947,166 A    8/1990   Wingate et al.
5,117,105 A    5/1992   Nagase et al.

\* cited by examiner

*Primary Examiner*—Lam T. Mai
(74) *Attorney, Agent, or Firm*—Woodard, Emhardt, Moriarty, McNett & Henry LLP (57) ABSTRACT

An absolute position encoder for identifying which of a plurality of loci a moveable member occupies comprises a plurality of data tracks in which binary data is encoded to form a series of n-bit words, each of the plurality of loci being associated with one of the n-bit words. A plurality of the n-bit words is required to uniquely determine which of the loci the moveable member occupies. The absolute position encoder does not use a clock track to resolve the problem of asynchronous bit transitions.

22 Claims, 5 Drawing Sheets

| # | Value | Binary | # | Value | Binary | # | Value | Binary | # | Value | Binary | # | Value | Binary |
|---|---|---|---|---|---|---|---|---|---|---|---|---|---|---|
| 0 | 4 | 100 | 90 | 4 | 100 | 180 | 2 | 010 | 270 | 2 | 010 | 360 | 7 | 111 |
| 1 | 0 | 000 | 91 | 0 | 000 | 181 | 3 | 011 | 271 | 3 | 011 | 361 | 3 | 011 |
| 2 | 2 | 010 | 92 | 1 | 001 | 182 | 1 | 001 | 272 | 7 | 111 | 362 | 1 | 001 |
| 3 | 6 | 110 | 93 | 3 | 011 | 183 | 0 | 000 | 273 | 6 | 110 | 363 | 5 | 101 |
| 4 | 7 | 111 | 94 | 2 | 010 | 184 | 2 | 010 | 274 | 4 | 100 | 364 | 4 | 100 |
| 5 | 5 | 101 | 95 | 6 | 110 | 185 | 6 | 110 | 275 | 0 | 000 | 365 | 6 | 110 |
| 6 | 1 | 001 | 96 | 4 | 100 | 186 | 4 | 100 | 276 | 2 | 010 | 366 | 2 | 010 |
| 7 | 3 | 011 | 97 | 0 | 000 | 187 | 0 | 000 | 277 | 3 | 011 | 367 | 3 | 011 |
| 8 | 7 | 111 | 98 | 2 | 010 | 188 | 1 | 001 | 278 | 1 | 001 | 368 | 7 | 111 |
| 9 | 5 | 101 | 99 | 6 | 110 | 189 | 3 | 011 | 279 | 0 | 000 | 369 | 6 | 110 |
| 10 | 1 | 001 | 100 | 7 | 111 | 190 | 2 | 010 | 280 | 2 | 010 | 370 | 4 | 100 |
| 11 | 3 | 011 | 101 | 5 | 101 | 191 | 6 | 110 | 281 | 6 | 110 | 371 | 0 | 000 |
| 12 | 2 | 010 | 102 | 1 | 001 | 192 | 4 | 100 | 282 | 4 | 100 | 372 | 2 | 010 |
| 13 | 0 | 000 | 103 | 3 | 011 | 193 | 0 | 000 | 283 | 0 | 000 | 373 | 3 | 011 |
| 14 | 1 | 001 | 104 | 7 | 111 | 194 | 2 | 010 | 284 | 1 | 001 | 374 | 1 | 001 |
| 15 | 5 | 101 | 105 | 5 | 101 | 195 | 6 | 110 | 285 | 3 | 011 | 375 | 0 | 000 |
| 16 | 7 | 111 | 106 | 1 | 001 | 196 | 7 | 111 | 286 | 2 | 010 | 376 | 2 | 010 |
| 17 | 3 | 011 | 107 | 3 | 011 | 197 | 5 | 101 | 287 | 6 | 110 | 377 | 6 | 110 |
| 18 | 2 | 010 | 108 | 2 | 010 | 198 | 1 | 001 | 288 | 4 | 100 | 378 | 4 | 100 |
| 19 | 0 | 000 | 109 | 0 | 000 | 199 | 3 | 011 | 289 | 0 | 000 | 379 | 0 | 000 |
| 20 | 1 | 001 | 110 | 1 | 001 | 200 | 7 | 111 | 290 | 2 | 010 | 380 | 1 | 001 |
| 21 | 3 | 011 | 111 | 5 | 101 | 201 | 5 | 101 | 291 | 6 | 110 | 381 | 3 | 011 |
| 22 | 7 | 111 | 112 | 7 | 111 | 202 | 1 | 001 | 292 | 7 | 111 | 382 | 2 | 010 |
| 23 | 5 | 101 | 113 | 3 | 011 | 203 | 3 | 011 | 293 | 5 | 101 | 383 | 6 | 110 |

*Fig. 1a*

| # | Value | Binary | # | Value | Binary | # | Value | Binary | # | Value | Binary | # | Value | Binary |
|---|---|---|---|---|---|---|---|---|---|---|---|---|---|---|
| 24 | 4 | 100 | 114 | 2 | 010 | 204 | 2 | 010 | 294 | 1 | 001 | 384 | 4 | 100 |
| 25 | 0 | 000 | 115 | 0 | 000 | 205 | 0 | 000 | 295 | 3 | 011 | 385 | 0 | 000 |
| 26 | 1 | 001 | 116 | 1 | 001 | 206 | 1 | 001 | 296 | 7 | 111 | 386 | 2 | 010 |
| 27 | 5 | 101 | 117 | 3 | 011 | 207 | 5 | 101 | 297 | 5 | 101 | 387 | 6 | 110 |
| 28 | 7 | 111 | 118 | 7 | 111 | 208 | 7 | 111 | 298 | 1 | 001 | 388 | 7 | 111 |
| 29 | 6 | 110 | 119 | 5 | 101 | 209 | 3 | 011 | 299 | 3 | 011 | 389 | 5 | 101 |
| 30 | 4 | 100 | 120 | 4 | 100 | 210 | 2 | 010 | 300 | 2 | 010 | 390 | 1 | 001 |
| 31 | 5 | 101 | 121 | 0 | 000 | 211 | 0 | 000 | 301 | 0 | 000 | 391 | 3 | 011 |
| 32 | 7 | 111 | 122 | 1 | 001 | 212 | 1 | 001 | 302 | 1 | 001 | 392 | 7 | 111 |
| 33 | 3 | 011 | 123 | 5 | 101 | 213 | 3 | 011 | 303 | 5 | 101 | 393 | 5 | 101 |
| 34 | 2 | 010 | 124 | 7 | 111 | 214 | 7 | 111 | 304 | 7 | 111 | 394 | 1 | 001 |
| 35 | 6 | 110 | 125 | 6 | 110 | 215 | 5 | 101 | 305 | 3 | 011 | 395 | 3 | 011 |
| 36 | 7 | 111 | 126 | 4 | 100 | 216 | 4 | 100 | 306 | 2 | 010 | 396 | 2 | 010 |
| 37 | 5 | 101 | 127 | 5 | 101 | 217 | 0 | 000 | 307 | 0 | 000 | 397 | 0 | 000 |
| 38 | 4 | 100 | 128 | 7 | 111 | 218 | 1 | 001 | 308 | 1 | 001 | 398 | 1 | 001 |
| 39 | 0 | 000 | 129 | 3 | 011 | 219 | 5 | 101 | 309 | 3 | 011 | 399 | 5 | 101 |
| 40 | 2 | 010 | 130 | 2 | 010 | 220 | 7 | 111 | 310 | 7 | 111 | 400 | 7 | 111 |
| 41 | 3 | 011 | 131 | 6 | 110 | 221 | 6 | 110 | 311 | 5 | 101 | 401 | 3 | 011 |
| 42 | 7 | 111 | 132 | 7 | 111 | 222 | 4 | 100 | 312 | 4 | 100 | 402 | 2 | 010 |
| 43 | 6 | 110 | 133 | 5 | 101 | 223 | 5 | 101 | 313 | 0 | 000 | 403 | 0 | 000 |
| 44 | 2 | 010 | 134 | 4 | 100 | 224 | 7 | 111 | 314 | 1 | 001 | 404 | 1 | 001 |
| 45 | 3 | 011 | 135 | 0 | 000 | 225 | 3 | 011 | 315 | 5 | 101 | 405 | 3 | 011 |
| 46 | 1 | 001 | 136 | 2 | 010 | 226 | 2 | 010 | 316 | 7 | 111 | 406 | 7 | 111 |

*Fig. 1b*

| # | Value | Binary | # | Value | Binary | # | Value | Binary | # | Value | Binary | # | Value | Binary |
|---|---|---|---|---|---|---|---|---|---|---|---|---|---|---|
| 47 | 5 | 101 | 137 | 3 | 011 | 227 | 6 | 110 | 317 | 6 | 110 | 407 | 5 | 101 |
| 48 | 4 | 100 | 138 | 7 | 111 | 228 | 7 | 111 | 318 | 4 | 100 | 408 | 4 | 100 |
| 49 | 0 | 000 | 139 | 6 | 110 | 229 | 5 | 101 | 319 | 5 | 101 | 409 | 0 | 000 |
| 50 |   |   | 140 |   |   | 230 | 0 | 000 | 320 |   |   | 410 |   |   |
| 51 | 3 | 011 | 141 | 3 | 011 | 231 | 2 | 010 | 321 | 3 | 011 | 411 | 5 | 101 |
| 52 | 7 | 111 | 142 | 1 | 001 | 232 | 2 | 010 | 322 | 2 | 010 | 412 | 7 | 111 |
| 53 | 6 | 110 | 143 | 5 | 101 | 233 | 3 | 011 | 323 | 6 | 110 | 413 | 6 | 110 |
| 54 | 2 | 010 | 144 | 4 | 100 | 234 | 7 | 111 | 324 | 7 | 111 | 414 | 4 | 100 |
| 55 | 0 | 000 | 145 | 0 | 000 | 235 | 6 | 110 | 325 | 5 | 101 | 415 | 5 | 101 |
| 56 | 1 | 001 | 146 | 1 | 001 | 236 | 2 | 010 | 326 | 4 | 100 | 416 | 7 | 111 |
| 57 | 5 | 101 | 147 | 3 | 011 | 237 | 3 | 011 | 327 | 0 | 000 | 417 | 3 | 011 |
| 58 | 4 | 100 | 148 | 7 | 111 | 238 | 1 | 001 | 328 | 2 | 010 | 418 | 2 | 010 |
| 59 | 0 | 000 | 149 | 6 | 110 | 239 | 5 | 101 | 329 | 3 | 011 | 419 | 6 | 110 |
| 60 | 2 | 010 | 150 | 2 | 010 | 240 | 4 | 100 | 330 | 7 | 111 | 420 | 7 | 111 |
| 61 | 6 | 110 | 151 | 0 | 000 | 241 | 0 | 000 | 331 | 6 | 110 | 421 | 5 | 101 |
| 62 | 4 | 100 | 152 | 1 | 001 | 242 | 1 | 001 | 332 | 2 | 010 | 422 | 4 | 100 |
| 63 | 5 | 101 | 153 | 5 | 101 | 243 | 3 | 011 | 333 | 3 | 011 | 423 | 0 | 000 |
| 64 | 7 | 111 | 154 | 4 | 100 | 244 | 7 | 111 | 334 | 1 | 001 | 424 | 2 | 010 |
| 65 | 6 | 110 | 155 | 0 | 000 | 245 | 6 | 110 | 335 | 5 | 101 | 425 | 3 | 011 |
| 66 | 4 | 100 | 156 | 2 | 010 | 246 | 2 | 010 | 336 | 4 | 100 | 426 | 7 | 111 |
| 67 | 0 | 000 | 157 | 6 | 110 | 247 | 0 | 000 | 337 | 0 | 000 | 427 | 6 | 110 |
| 68 | 1 | 001 | 158 | 4 | 100 | 248 | 1 | 001 | 338 | 1 | 001 | 428 | 2 | 010 |
| 69 | 5 | 101 | 159 | 5 | 101 | 249 | 5 | 101 | 339 | 3 | 011 | 429 | 3 | 011 |

*Fig. 1c*

| # | Value | Binary | # | Value | Binary | # | Value | Binary | # | Value | Binary | # | Value | Binary |
|---|---|---|---|---|---|---|---|---|---|---|---|---|---|---|
| 70 | 4 | 100 | 160 | 7 | 111 | 250 | 4 | 100 | 340 | 7 | 111 | 430 | 1 | 001 |
| 71 | 6 | 110 | 161 | 6 | 110 | 251 | 0 | 000 | 341 | 6 | 110 | 431 | 5 | 101 |
| 72 | 7 | 111 | 162 | 4 | 100 | 252 | 2 | 010 | 342 | 2 | 010 | 432 | 4 | 100 |
| 73 | 3 | 011 | 163 | 0 | 000 | 253 | 6 | 110 | 343 | 0 | 000 | 433 | 0 | 000 |
| 74 | 1 | 001 | 164 | 1 | 001 | 254 | 4 | 100 | 344 | 1 | 001 | 434 | 1 | 001 |
| 75 | 5 | 101 | 165 | 5 | 101 | 255 | 5 | 101 | 345 | 5 | 101 | 435 | 3 | 011 |
| 76 | 4 | 100 | 166 | 4 | 100 | 256 | 7 | 111 | 346 | 4 | 100 | 436 | 7 | 111 |
| 77 | 6 | 110 | 167 | 6 | 110 | 257 | 6 | 110 | 347 | 0 | 000 | 437 | 6 | 110 |
| 78 | 2 | 010 | 168 | 7 | 111 | 258 | 4 | 100 | 348 | 2 | 010 | 438 | 2 | 010 |
| 79 | 3 | 011 | 169 | 3 | 011 | 259 | 0 | 000 | 349 | 6 | 110 | 439 | 0 | 000 |
| 80 | 7 | 111 | 170 | 1 | 001 | 260 | 1 | 001 | 350 | 4 | 100 | 440 | 1 | 001 |
| 81 | 6 | 110 | 171 | 5 | 101 | 261 | 5 | 101 | 351 | 5 | 101 | 441 | 5 | 101 |
| 82 | 4 | 100 | 172 | 4 | 100 | 262 | 4 | 100 | 352 | 7 | 111 | 442 | 4 | 100 |
| 83 | 0 | 000 | 173 | 6 | 110 | 263 | 6 | 110 | 353 | 6 | 110 | 443 | 0 | 000 |
| 84 | 2 | 010 | 174 | 2 | 010 | 264 | 7 | 111 | 354 | 4 | 100 | 444 | 2 | 010 |
| 85 | 3 | 011 | 175 | 3 | 011 | 265 | 3 | 011 | 355 | 0 | 000 | 445 | 6 | 110 |
| 86 | 1 | 001 | 176 | 7 | 111 | 266 | 1 | 001 | 356 | 1 | 001 | 446 | 4 | 100 |
| 87 | 0 | 000 | 177 | 6 | 110 | 267 | 5 | 101 | 357 | 5 | 101 | 447 | 5 | 101 |
| 88 | 2 | 010 | 178 | 4 | 100 | 268 | 4 | 100 | 358 | 4 | 100 | 448 | 7 | 111 |
| 89 | 6 | 110 | 179 | 0 | 000 | 269 | 6 | 110 | 359 | 6 | 110 | 449 | 6 | 110 |

ABSOLUTE POSITION CHAIN ENCODER

FIELD OF THE INVENTION

The present invention relates generally to the field of position encoders used to detect the position of a rotating member. More specifically, the present invention relates to an absolute position chain encoder using a split gray code.

BACKGROUND

Position encoders are used in a variety of applications to provide feedback identifying the position of a moveable member. Such moveable members are often rotating members, such as steering wheels on automobiles, but linear motion can also be measured. In addition to measuring the position of steering wheels, rotational position encoders are also used, for example, in milling applications, such as with lathes used to manufacture fans for turbine engines, or in brushless motors. In many applications position encoders must be highly robust in order to provide safe operation of the system. For example, failure of a position encoder used to read the position of a steering wheel in a power steering system could be catastrophic if it occurred while operating the vehicle.

Typically, position encoders operate by dividing the entire range of possible positions for a moveable member into a pre-selected number of loci. The larger the number, the smaller each individual locus, and therefore the more precisely the position of the moveable member will be measured. (For the purposes of this document, and as is known in the art, the term "absolute position" refers to any position within a discreet locus; thus, measuring the moveable member's absolute position refers to identifying which of the loci the member presently occupies.) The position encoder provides a plurality of data tracks, each typically including a datum associated with each of the loci. (It is theoretically possible to use data tracks that include no data for one or more loci, but since one of the primary design objectives is to compact as much information as possible into the fewest number of tracks, thereby reducing the cost of the encoder, it is almost always disadvantageous to do so.) Together, the data associated with the loci form n-symbol words that identify the loci. Typically, the data are binary digital data, and thus the n-symbol words are n-bit words.

A variety of position encoders are known in the art, and are used in a various applications. For example, position encoders are disclosed in U.S. Pat. Nos. 4,628,298 to Hafle et al., 5,117,105 to Nagase et al., and 4,947,166 to Wingate et al., each of which is hereby incorporated in its entirety.

Position encoders generally use one of two mechanisms for physically recording the bits that encode position: optical and magnetic fields. Generally, optical encoding is preferred because it provides superior resolution. At any appreciable distance from the magnets with alternating poles the magnetic field becomes a blurred mixture. However, optical encoding generally requires the use of light emitting diodes ("LEDs"), which have an undesirably low operating life at high temperature. Consequently, magnetic encoding is typically preferred for high temperature applications.

Position encoders fall generally into one of two categories: relative, or incremental encoders, and absolute position encoders. Incremental encoders detect only when the moveable member has translated or rotated at least a pre-determined distance, whereas absolute position encoders actually measure the position of the moveable member. For example, a simple incremental encoder might rely only upon a single track of alternating bits, and identify only when the observed bit flips. In contrast, a simple absolute encoder might have $\log_2(n)$ tracks, where "n" is the number of discreet positions encoded, such that each position can be assigned a unique binary code.

Generally, absolute position encoders are more useful, because incremental encoders lose track of where the moveable member is when the system is powered down. Also, incremental encoders are more prone to error propagation, since once a change in position has occurred without detection there's no way for the encoder to recapture that movement. However, absolute position encoders tend to be more expensive, because they require a larger number of data bits, which required a larger number of detectors to read. As the resolution of the absolute encoder increases the number of tracks required to encode the position data also increases.

A common difficulty with multi-track encoders is that the detection of multiple bits flipping during a transition is liable to be unsynchronized. This can result in the system reading an erroneous extra transition. For example, if two adjacent words are 11001 and 11010, unless the detectors for the last two tracks are perfectly synchronized the encoder is liable to read 11011 or 11000 between the transition from one to the other. In order to combat this shortcoming position encoders often use a "clock track." The clock track is used to tell the encoder when to read a new word. The bit transitions of the clock track can be offset a half-bit from the transitions of the other tracks, so that the precise position at which the data tracks transition is unimportant. In certain other encoders, a clock track is offset by a quarter bit, so that the timing of its transition compared to one or more of the other tracks can be used to detect the direction of rotation. Clock tracks, however, generally require an additional detector just to read the clock track.

There is, therefore, a need for a position encoder that combines the advantages of incremental and absolute position encoders. A position encoder is needed that can recapture missed detection of motion and provide position data shortly after start-up, while using a lower number of data tracks and corresponding detectors. The present invention is directed towards meeting these needs, among others.

SUMMARY OF THE INVENTION

In a first embodiment, a position encoder according to the present invention for detecting which of a plurality of loci a moveable member occupies comprises a plurality of data tracks forming a series of data words associated with the loci. The data words obey the following rules: (1) all data in each data word is identical to all data in every data word associated with an adjacent locus, except for the data in exactly one of the data tracks; (2) no data word is adjacent to two data words that are identical to each other; and (3) there exists a sequence length, y, for which no y-length series of adjacent data words appears more than once in the data tracks, and the smallest sequence length is greater than 1, but less than half of the length of the data tracks.

In a second embodiment, a position encoder according to the present invention for identifying which of a set of m different loci a moveable member occupies comprises a binary matrix of m, n-length vectors N. The matrix of vectors N obeys the following conditions: (1) $\forall N_k, N_{k+1} \Sigma_{(i=1 \text{ to } n)}(n_{k,i}+n_{k+1,i} \bmod 2)=1$; (2) $\forall N_k, N_k \neq N_{k+2}$; (3) $\exists y | \forall N_k, N_j \{[N_k, N_{k+1}, \ldots N_{k+y}]\} \cap \{[N_j, N_{j+1}, \ldots N_{j+y}]\} = \{\ \}y<m$; and (4) $\forall y | \forall N_k, N_j \{[N_k, N_{k+1}, \ldots N_{k+y}]\} \cap \{[N_j, N_{j+1}, \ldots N_{j+y}]\} = \{\ \}; 1<y$. Each of the plurality of loci is associated with one of the vectors N.

In a third embodiment, an absolute position encoder for identifying which of a plurality of loci a moveable member occupies comprises a plurality of data tracks in which binary data is encoded to form a series of n-bit words, each of the plurality of loci being associated with one of the n-bit words. A plurality of the n-bit words is required to uniquely determine which of the loci the moveable member occupies. The absolute position encoder lacks a clock track.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended. Alterations and modifications in the illustrated device, and further applications of the principles of the invention as illustrated therein are herein contemplated as would normally occur to one skilled in the art to which the invention relates.

A position encoder according to the present invention detects the position of a moveable member. A preferred embodiment encoder according to the present invention provides robust absolute position information, and yet requires a relatively low number of data tracks. The present invention therefore provides position detection that provides superior safety in sensitive applications, such as power steering mechanisms, and yet is relatively inexpensive.

A preferred embodiment encoder according to the present invention comprises a plurality of data tracks that together associate each of the loci with an n-bit word. In the preferred embodiment each of the data tracks contributes a single bit to each of the n-bit words. The n-bit words are selected and associated with each of the loci according to the following criteria:

1. Any two adjacent words differ in exactly one bit;
2. Words separated by exactly one intervening word are never identical;
3. For some "sequence length" "y" having a value that is greater than 1, but less than the total number of n-bit words, no y-length series of words is repeated anywhere in the data tracks;

For example, criterion (1) requires that if a given locus is assigned the four bit word "1111," the words assigned to the two adjacent loci will each contain exactly one "0." Criterion (2) requires that there are no three word palindromes anywhere in the data track. Illustratively, continuing from the above example, the one "0" in each of the two adjacent words will be in different positions within the respective 4 bit words. Finally, with respect to criterion (3), it will be understood that the sequence length "y" is the number of n-bit words that must be read in upon system start-up in order to acquire an absolute position. Although not stated as a criteria, it will be understood that in order to comply with the above three conditions, each n-bit word has at least three bits.

By way of example, the criteria for constructing a split gray code according to the present invention can be expressed mathematically. For example, a binary split gray code that identifies position divided into m loci, each associated with an n-bit word, comprises a matrix of m, n-length vectors N, obeying the following criteria:

$$\forall N_k, N_{k+1} \Sigma_{(i=1 \; to \; n)}(n_{k,i}+n_{k+1,i} \bmod 2)=1; n \geq 3; \qquad (a)$$

$$\forall N_k, N_k \neq N_{k+2}; \qquad (b)$$

$$\exists y | \forall N_k, N_j \{[N_k, N_{k+1}, \ldots N_{k+y}]\} \cap \{[N_j, N_{j+1}, \ldots N_{j+y}]\} = \{ \; \}; y<m; j \neq k; \qquad (c)$$

$$\forall y | \forall N_k, N_j \{[N_k, N_{k+1}, \ldots N_{k+y}]\} \cap \{[N_j, N_{j+1}, \ldots N_{j+y}]\} = \{ \; \}; 1<y; j \neq k; \qquad (d)$$

Upon initialization of the system, the encoder will read the present n-bit word. Because the sequence length, y, is greater than 1, the encoder does not immediately determine which locus the moveable member occupies. As the moveable member moves from locus to locus additional n-bit words are read. Once a y-length series of adjacent n-bit words has been read, the present locus of the moveable member is determined. As is known in the art, this determination is preferably performed by electronic circuitry, including an appropriate look-up table containing the complete chain code. Note that in order to uniquely identify a locus, a y-length series of adjacent n-bit words must be unique regardless of the direction in which the y-length series is read, since the direction of rotation is determined only by the n-bit words themselves, as described in greater detail hereinbelow.

Figure 1A:
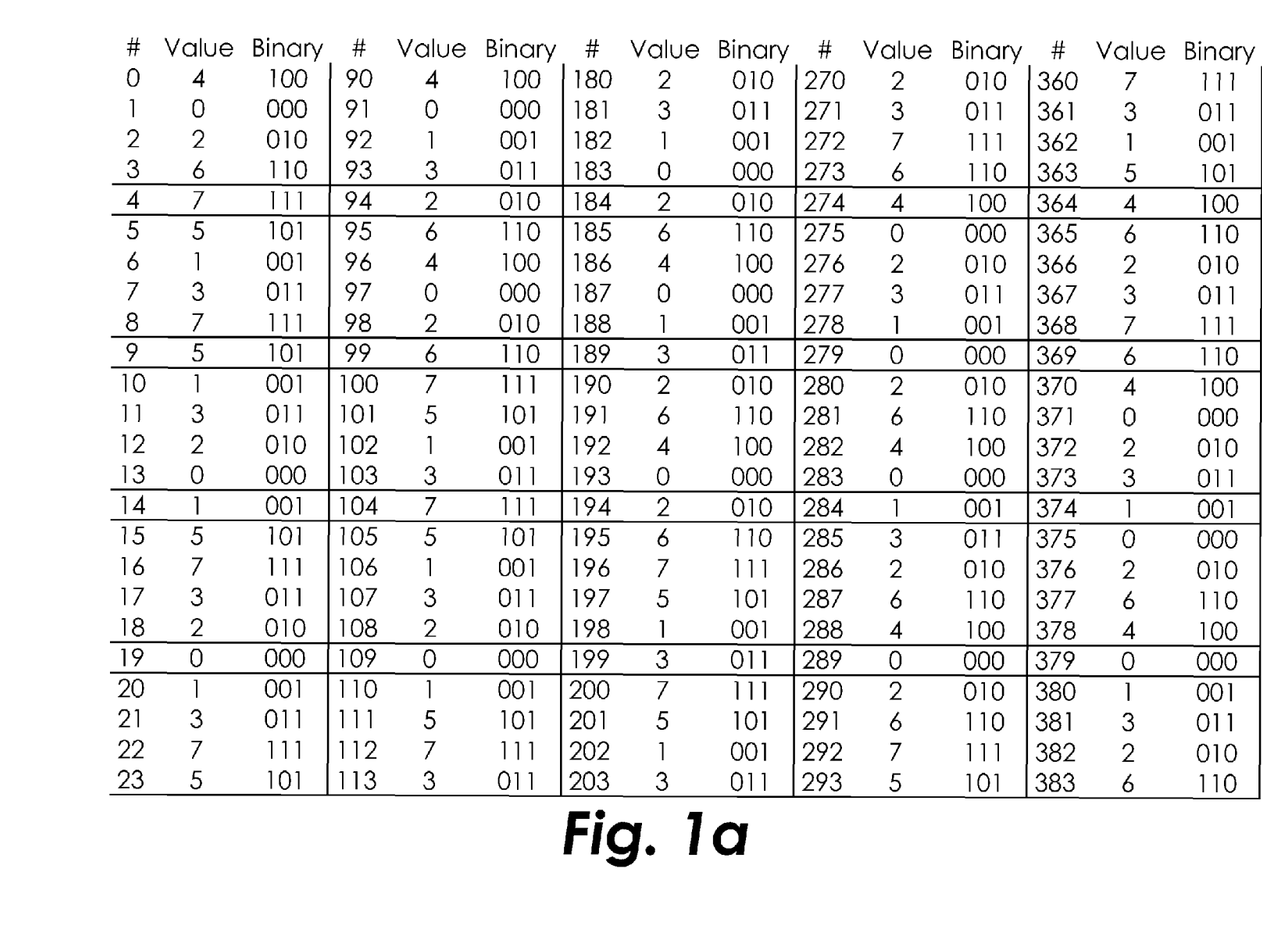
FIGS. 1a-d together are a table containing a chain code suitable for use in a position encoder according to the present invention, in which the resolution is 1/450th of the entire range of motion, and the sequence length is 5.
Figure 1B:
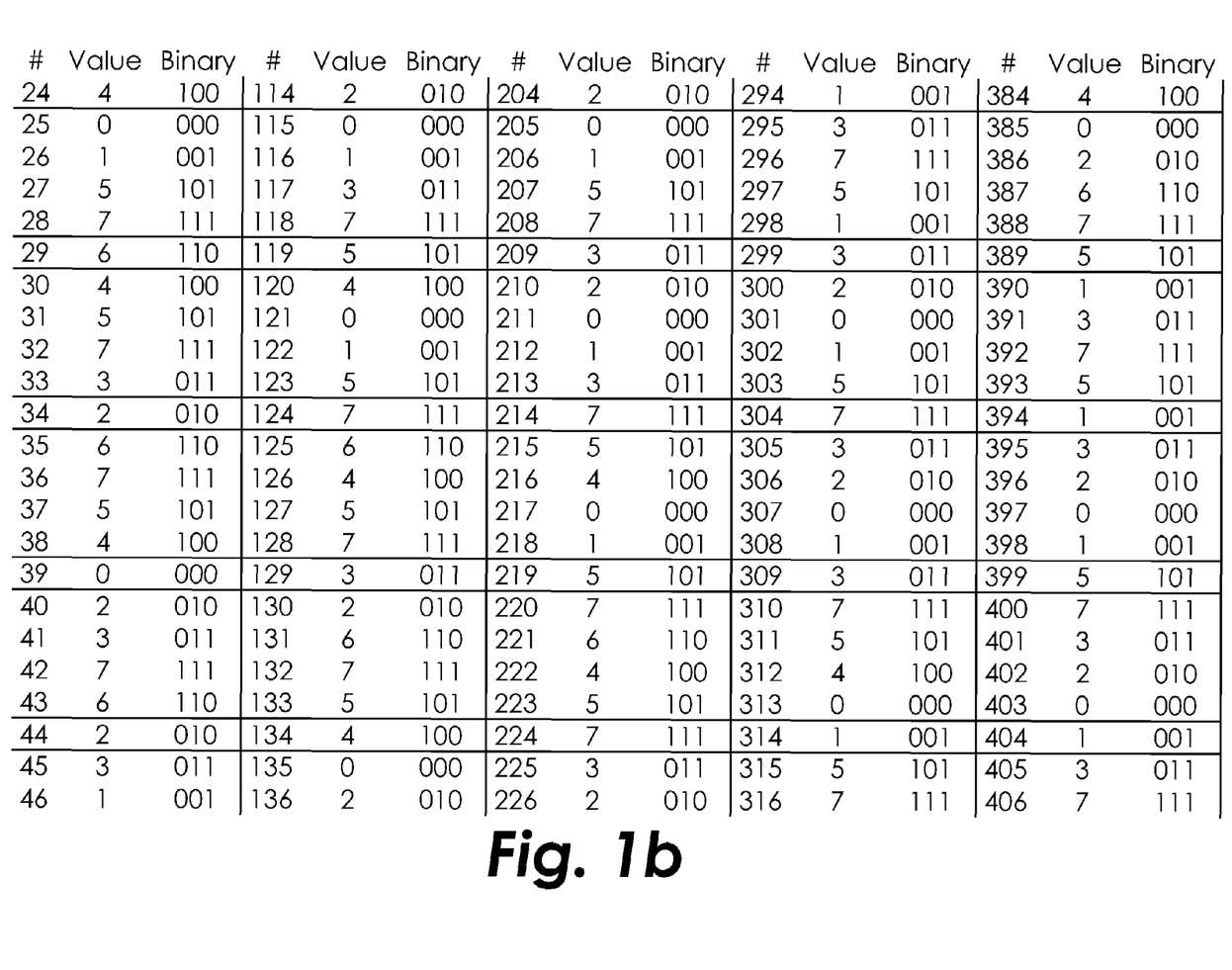
Figure 1C:
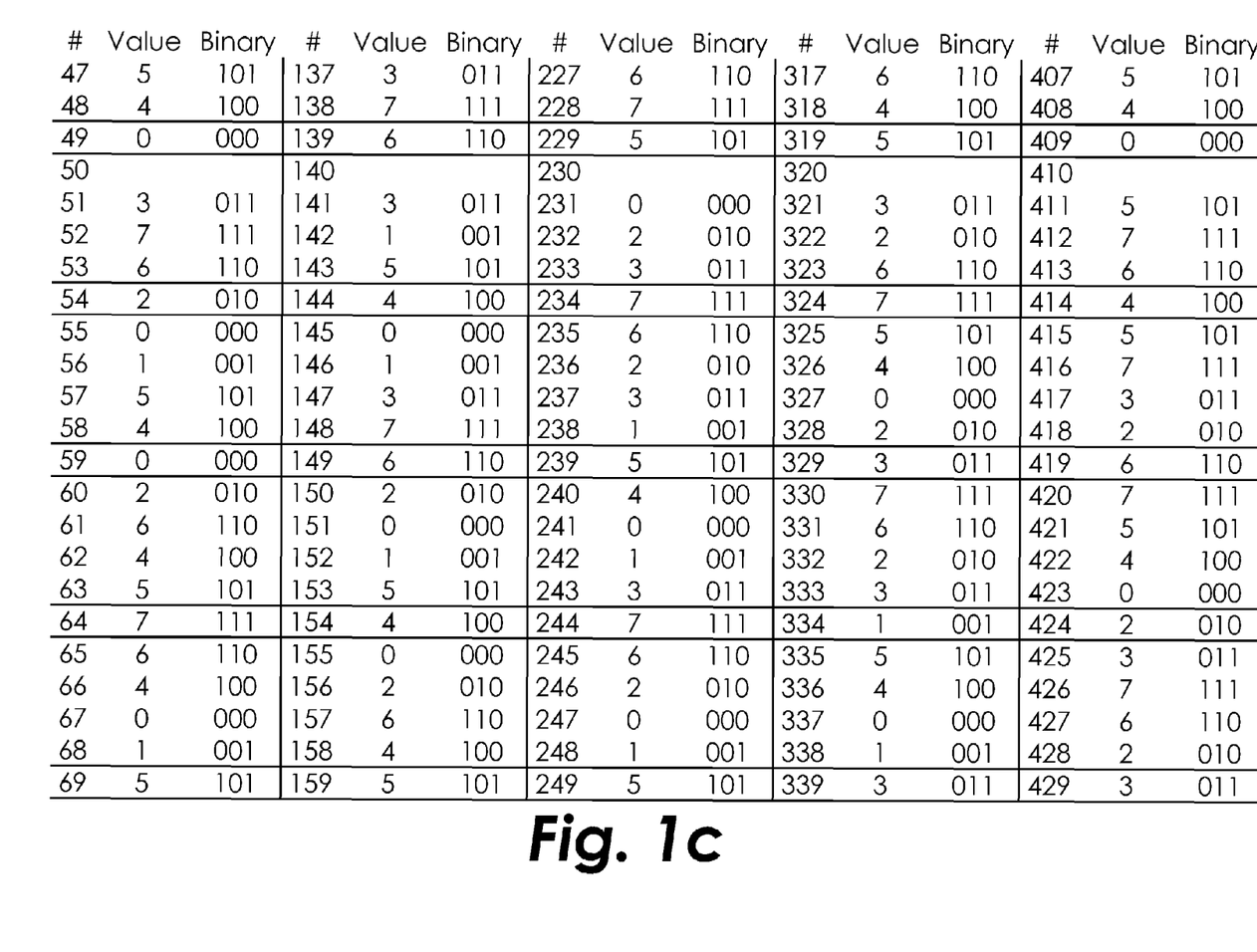
Figure 1D:
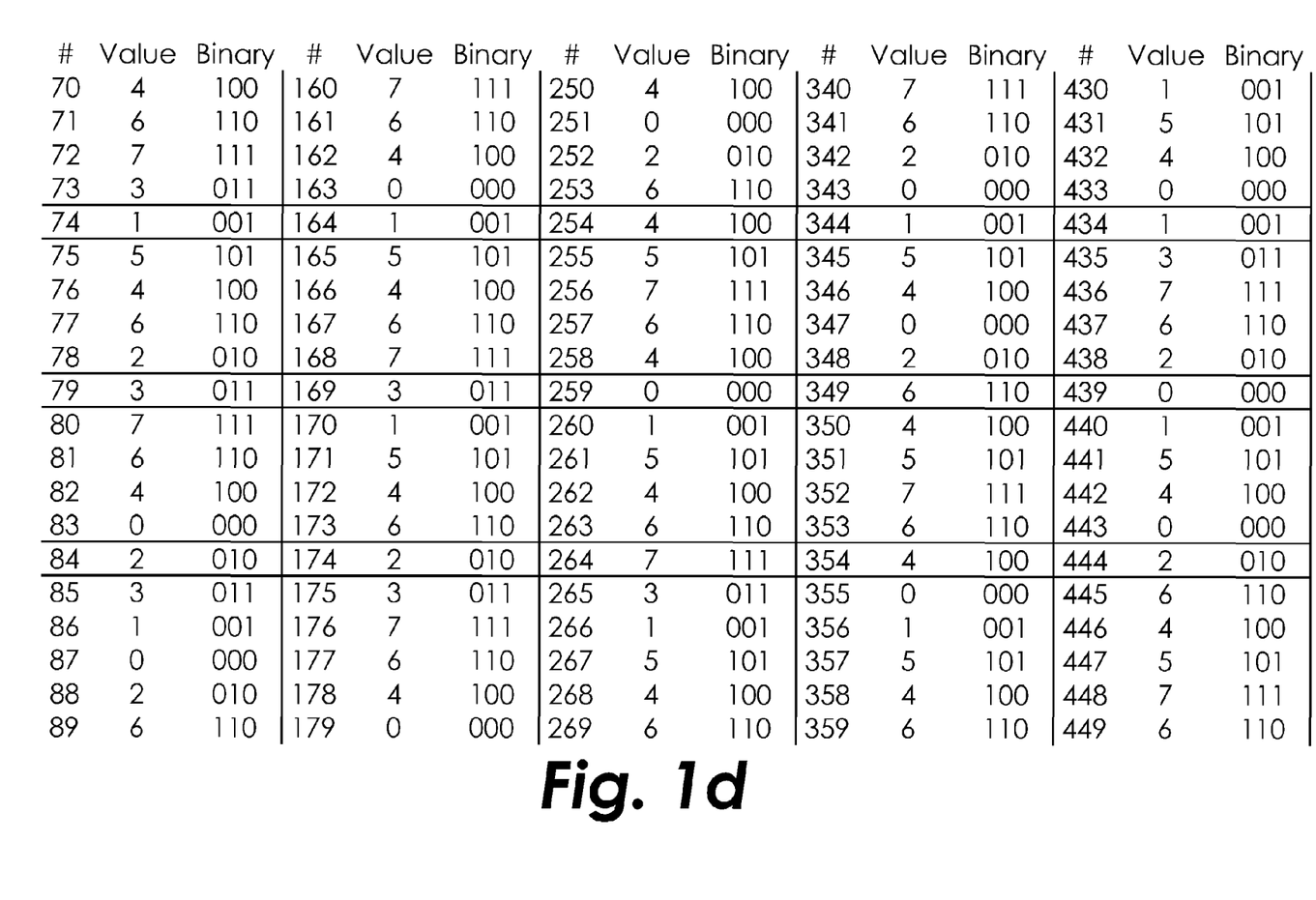

It will be appreciated that, even with a small value of n, e.g. 3, a chain code according to the present invention can provide good resolution with a relatively small value of y. Preferably, y will be smaller than a quarter of the total number of loci. In practice, y can be at least as small as about 1/90th of the total number of loci, assuming 450 loci and n=3. One non-limiting example sample chain code is shown in FIGS. 1A and 1B, discussed in greater detail herein below.

Since y must be greater than 1, it will be appreciated that the absolute position of the moveable member is determined by a plurality of bits that are distributed over a range of positions greater than the resolution of the encoder. Thus, in effect, a position encoder according to the present invention employs a "split code," or "parallel code."

For example, in an encoder using four-bit words, if the sequence length is four, 16 bits, distributed over a range of positions four times greater than the encoder's resolution, encode the absolute position of the moveable member. The encoder can detect which of the four loci within that area the moveable member occupies using the transitions between the four-bit words that make up the 16 bits. Such an encoder according to the present invention encodes information in only 4 tracks that would otherwise require 16 data tracks (including the corresponding additionally required reading mechanisms for each track). Thus, an encoder according to the present invention permits encoding of position with a higher resolution, and yet which costs less to manufacture.

In at least one alternative embodiment, four data tracks are used to improve the ability of the system to detect any single point failure at any time. As a non-limiting example, in addition to criteria (1), (2) and (3) discussed above, a criterion (4) is added to select and associate the n-bit words in the tracks with each of the loci. Criterion (4) states that:

(4) For any data track, the "run length", defined as the number of consecutive bits in a run in a data track having the same state, is less than the sequence length "y".

Criterion (4) helps prevent the temporary miscalculation of position in the event of a light source/detector failure during initialization.

A further advantage of an encoder according to the present invention is the elimination of the need for a clock track. Since the position of the moveable member is encoded in a gray code—that is, only one bit flips between adjacent words—it is impossible for a false, intermediate word to be read by the encoder. Consequently, each time any bit flips the encoder can safely assume that the moveable member has moved to a different locus. Therefore, the clocking of the encoder can be extracted directly from the data tracks that encode the position of the moveable member.

Likewise, an encoder according to the present invention can determine the direction of motion of the moveable member directly from the data encoding the position, rather than from a quadrature track. Once y n-bit words have been read in, the encoder can determine the absolute position of the encoder. This information can subsequently be combined with the information from each new n-bit word that is read. Consequently, although the n-bit words do not individually contain sufficient information to identify the absolute position of the movable member, once it has initially determined the absolute position the encoder can track it based on each new observed n-bit word.

Note that, prior to reading y n-bit words, the restriction against palindromes in the data words implies that each time the encoder reads a word that is identical to the second-previous word it must be due to "dither" (a reverse in the direction of motion). Thus, an encoder according to the present invention can detect the change of direction of motion in the moveable member through the presence or absence of repetition of observed words in the data that encodes position.

One benefit of this ability to detect changes in the direction of motion is that the encoder can determine the absolute position of the moveable member as soon as it has traversed a sufficient distance to read in y n-bit words, even if that motion included back-and-forth motion sufficient to cause some of the y n-bit words to be read multiple times.

FIGS. 1a-d are a table illustrating a sample chain code suitable for use in a position encoder according to the present invention, having a sequence length of 5. The chain code uses three-bit words, and yet permits identification of 450 distinct loci. The columns headed "#" identify the series of 450 adjacent loci with a decimal number. The chain code itself is recorded in the columns headed "Binary." Thus, the column headed "Binary" contains a matrix of 450 3-bit words. A decimal (or octal) value for the binary numbers is recorded in the columns headed "Value."

A typical absolute position encoder using three-bit words would permit only 8 loci to be distinguished, since 3 bits provide only 8 unique 3-bit words. In the chain code of FIGS. 1A and 1B, however, each 3-bit word is associated with a plurality of loci. For example, the word "000" appears 56 times. However, each series of 5 3-bit words is unique.

Thus, each locus is uniquely identified by 15 bits, distributed over positions encompassing 5 times the resolution provided by the chain code.

Note that even longer chain codes can be generated, without adding additional data tracks, simply by increasing the sequence length. For example, by extending the sequence length to 6, a chain code can be developed that increases the resolution offered by the chain code of FIGS. 1a-d. Note that this does not even necessarily increase the amount of absolute motion necessary to initialize the encoder. Although an additional 3-bit word must be read in to determine the absolute position of the moveable member, the increase in the resolution of the encoder means that less displacement is required to acquire each new 3-bit word.

Figure 2:
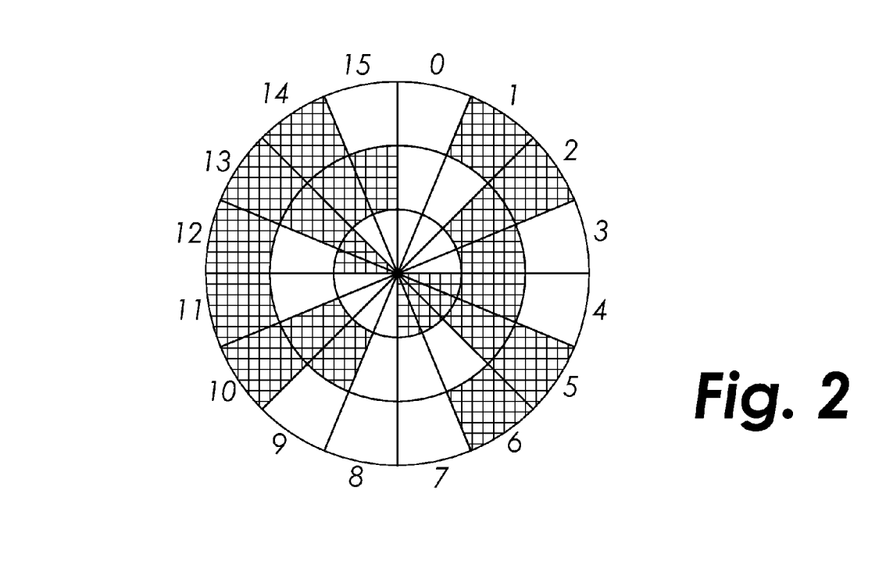
FIG. 2 is an illustration of a code wheel onto which a simple chain code according to the present invention have been optically encoded, suitable for use with an angular position encoder according to the present invention.
Figure 3:
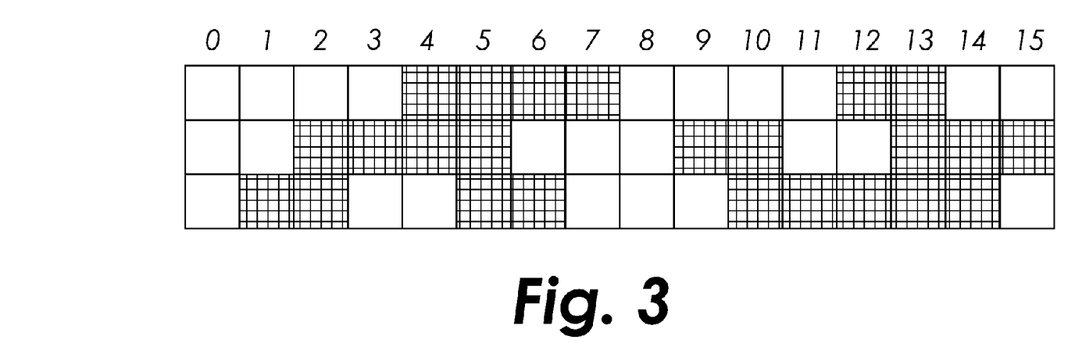
FIG. 3 is an illustration of a code strip onto which a simple chain code according to the present invention has been optically encoded, suitable for use with a translational position encoder according to the present invention.
Figure 4:
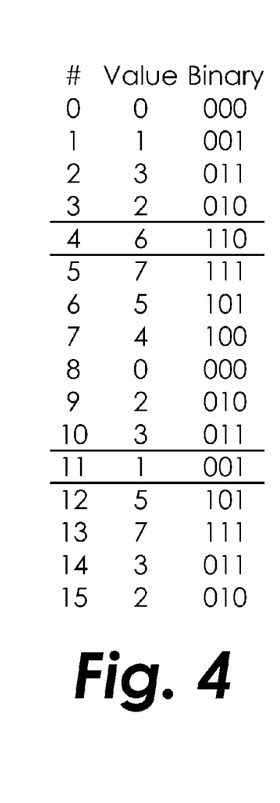
FIG. 4 is a table showing the binary and digital data that is optically encoded in the code wheel of FIG. 2 and the code strip of FIG. 3.

It will be appreciated that an absolute position encoder according to the present invention can be used to measure the position of both rotating and translating members. For example, a chain code can be recorded on a disk, as shown in FIG. 2, to measure an angular position. The chain code of FIGS. 1a-d could also be recorded on a rotating cylinder or ring for use with an angular position encoder, as would occur to a person of ordinary skill in the art. Alternatively, the chain code of FIGS. 1a-d could be recorded on a translating cylinder, such as a piston, or other such translating member, for use with a translational position encoder. FIG. 3 illustrates an example in which a chain code is recorded linearly, suitable for use, for example, on a flat bar for use with a linear position encoder, or on a ring or the outside of a rotating cylinder for use with an angular position encoder. FIG. 4 is a table illustrating the chain code used in FIGS. 2 and 3. Note that it's sequence length is 3, and that many chain codes according to the present invention are possible having a sequence of 3 that provide far greater resolution. The code of FIG. 4 is therefore not a preferred code; it is offered primarily for illustrative purposes.

The black and white regions shown in FIG. 2 encode the position information optically, and can be read by light detectors that measure reflected light emitted from an LED, as in known in the art. Alternatively, the black and white regions in FIG. 2 could correspond to surfaces that otherwise differ in albedo, or to transparent and opaque regions that can be read by light detectors that measure transmitted light. Likewise, the black and white regions could be encoded in magnets using opposite polarities, or using other physical properties, such as capacitance, inductance, magnetic permeability, surface texture, etc. The physical mechanism for recording and reading the binary data reflected in the chain code is immaterial to the present invention, and will generally be a function of other engineering and design objectives.

An absolute position encoder according to the present invention provides for safety in sensitive applications, such as power steering systems for automobiles, because it inherently permits error-checking. It will be appreciated that in most such applications only undetected, or "blind" errors are dangerous. This is because blind errors can give false readings that the position encoder will unknowingly rely upon. For example, if an absolute position encoder used to control a power steering system mistakenly decides that the steering wheel is at a position 20 degrees away from its actual position while the vehicle is being operated at high speed (such as on a highway), the result could be catastrophic. This contrasts with relatively benign "known" errors, in which the position encoder recognizes that an error has occurred, even without knowing exactly what the error was. In such cases, the position encoder simply fails to detect the position of the wheel after a small movement (and, presumably, the steering mechanism would leave the wheel position unchanged, pending additional, reliable data that will become available if and when the steering wheel is moved through additional positions). As long as such errors are limited to a relatively small portion of the bits read, the steering mechanism will continue to operate acceptably (though with a slight loss of resolution).

A position encoder according to the present invention provides safe position detection in such applications, because it is very unlikely to misidentify the position of the wheel. Consider what happens when a single bit is read incorrectly after acquisition in a 3-bit chain code according to the present invention: Since the chain code is constructed so that one and exactly one bit changes between adjacent words, two third of the time the result of misreading a bit will be that the newly read 3-bit word will differ from the last word in two of the three bits, producing a known error. The other third of the time, the result will be that the same word will be repeated, indicating that the wheel (or other moveable member) has not moved at all—until, that is, the wheel is moved into the next locus, at which point a new word that will differ in two bits will occur, again producing a known error. The net effect is that the chain code operates somewhat like a trellis decoder, in which rules regarding legal transitions provide redundancy that permits inherent error detection.

Thus, it will be appreciated that the same feature that eliminates the need for a clock track, the single bit flip between adjacent words, also inherently permits the position encoder to operate in a fashion similar to trellis decoder. The extra information that is bound up in transition rules provides redundancy that can be used to detect errors, thereby improving the signal quality when bit errors occur.

This contrasts with, for example, an absolute position encoder in which each locus is associated with a completely unique n-bit word. In such an encoder, any single bit error will cause the encoder to detect an essentially random, and incorrect, position. Thus, this simple encoder requires the maximum number of detectors, and yet provides no error protection.

In addition to providing great safety for sensitive applications, the robust ability to detect errors also facilitates recapture of the absolute position when errors do occur. That is, the redundant information contained in the rules for legal transitions, in addition to permitting the existence of an error, also aid in the identification of the specific error. This ability can be used to adaptively correct for individual bit errors, providing smooth operation even with less than perfect signal to noise ratios.

While the invention has been illustrated and described in detail in the drawings and foregoing description, the same is to be considered as illustrative and not restrictive in character. Only the preferred embodiment, and certain alternative embodiments deemed useful for further illuminating the preferred embodiment, has been shown and described. All changes and modifications that come within the spirit of the invention are desired to be protected. For example, while the preferred embodiment employs binary data to encode position, trinary (or other) encoding could likewise be used. Such an encoder would require correspondingly more complex detectors for each data track, and a correspondingly more complex mechanism for interpreting the detectors' signals, as would occur to one skilled in the art.

I claim:

1. A position encoder for detecting which of a plurality of loci a moveable member occupies, the position encoder comprising:
    a moveable member;
    a plurality of data tracks disposed on the moveable member, the plurality of data tracks forming a series of data words associated with the loci;
    wherein the data words obey the following rules:
        (a) all data in each data word is identical to all data in every data word associated with an adjacent locus, except for the data in exactly one of the data tracks;
        (b) no data word is adjacent to two data words that are identical to each other; and
        (c) there exists a sequence length, y, for which no y-length series of adjacent data words appears more than once in the data tracks, and the smallest sequence length y is greater than 1, but less than half of the length of the data tracks.

2. The position encoder of claim 1, wherein the plurality of data tracks comprises binary data.

3. The position encoder of claim 1, wherein the moveable member is a rotatable member.

4. The position encoder of claim 3, wherein the rotatable member is a steering wheel.

5. The position encoder of claim 1, wherein the plurality of data tracks consists of three binary data tracks.

6. The position encoder of claim 1, wherein a data track further comprises a maximum run length, and wherein for any given data track, said maximum run length is less than said sequence length.

7. The position encoder of claim 6, wherein said plurality of data tracks comprises binary data.

8. The position encoder of claim 6, wherein said moveable member is a rotatable member.

9. The position encoder of claim 8, wherein said rotatable member is a steering wheel.

10. The position encoder of claim 6, wherein the plurality of data tracks comprises four binary data tracks.

11. A position encoder for identifying which of a set of m different loci a moveable member occupies, the position encoder comprising:
    a moveable member;
    a binary matrix of m, n-length vectors N disposed on the moveable member, the vectors N obeying the following conditions:

$$\forall N_k, N_{k+1} \Sigma_{(i=1 \text{ to } n)}(n_{k,i}+n_{k+1,i} \bmod 2)=1; n \geq 3; \quad (a)$$

$$\forall N_k, N_k \neq N_{k+2}; \quad (b)$$

$$\exists y | \forall N_k, N_j \{[N_k, N_{k+1}, \ldots N_{k+y}]\} \cap \{[N_j, N_{j+1}, \ldots N_{j+y}]\} = \{\ \}; y<m; j \neq k; \quad (c)$$

$$\forall y | \forall N_k, N_j \{[N_k, N_{k+1}, \ldots N_{k+y}]\} \cap \{[N_j, N_{j+1}, \ldots N_{j+y}]\} = \{\ \}; 1<y; j \neq k; \quad (d)$$

wherein each of the plurality of loci is associated with one of the vectors N.

12. The position encoder of claim 11, wherein condition (c) further comprises:

$$y \leq m/90.$$

13. The position encoder of claim 11, wherein n=3.

14. The position encoder of claim 11, wherein n=4.

15. The position encoder of claim 14, wherein any given data track comprises a sequence length and a maximum run length, and wherein said maximum run length is less than said sequence length.

16. An absolute position encoder for identifying which of a plurality of loci a moveable member occupies, comprising:
- a moveable member;
- a plurality of data tracks disposed on the moveable member and in which binary data is encoded to form a series of n-bit words, each of the plurality of loci being associated with one of the n-bit words;
- wherein a plurality of the n-bit words is required to uniquely determine which of the loci the moveable member occupies; and
- wherein the absolute position encoder lacks a clock track.

17. The absolute position encoder of claim 16, wherein the moveable member is a rotatable member.

18. The absolute position encoder of claim 17, wherein the rotatable member is a steering wheel.

19. The absolute position encoder of claim 16, wherein the n=3.

20. The absolute position encode of claim 19, wherein the plurality of n-bit words that is required to uniquely determine which of the loci the moveable member occupies is always less than about 1/90th of the plurality of loci.

21. The absolute position encoder of claim 16, wherein the n=4.

22. The absolute position encoder of claim 21, wherein said data track further comprises a maximum run length and a sequence length; and wherein for any given data track, said run length is less than said sequence length.

* * * * *

UNITED STATES PATENT AND TRADEMARK OFFICE
CERTIFICATE OF CORRECTION

PATENT NO. : 7,289,041 B2  Page 1 of 1
APPLICATION NO. : 11/375708
DATED : October 30, 2007
INVENTOR(S) : Bruce Dalton It is certified that error appears in the above-identified patent and that said Letters Patent is hereby corrected as shown below:

In the DETAILED DESCRIPTION OF THE PREFERRED EMBODIMENT, in column 4, line 18, formula (c) and in the CLAIMS, column 8, line 51, formula (c) please replace the existing formulas with the following formula in its entirety:

$$\exists\, y \mid \forall\, N_k, N_j \,\{[N_k, N_{k+1}, \ldots N_{k+y}]\} \cap \{[N_j, N_{j+1}, \ldots N_{j+y}]\} = \{\}; \, y < m; \, j \neq k; \quad (c)$$

Signed and Sealed this

First Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 7,289,041 B2
APPLICATION NO. : 11/375708
DATED : October 30, 2007
INVENTOR(S) : Bruce Dalton Page 1 of 1

It is certified that error appears in the above-identified patent and that said Letters Patent is hereby corrected as shown below:

In the DETAILED DESCRIPTION OF THE PREFERRED EMBODIMENT, in column 4, line 18, formula (c) and in the CLAIMS, column 8, line 51, formula (c) please replace the existing formulas with the following formula in its entirety:

$$\exists y \mid \forall N_k, N_j \{[N_k, N_{k+1}, \ldots N_{k+y}]\} \cap \{[N_j, N_{j+1}, \ldots N_{j+y}]\} = \{ \}; y < m; j \neq k; \quad (c)$$

Signed and Sealed this

Eighth Day of April, 2008

JON W. DUDAS
*Director of the United States Patent and Trademark Office*